United States Patent [19]

Hayakawa et al.

[11] Patent Number: 4,968,195
[45] Date of Patent: Nov. 6, 1990

[54] METHOD AND TOOL FOR MACHINING A THREE DIMENSIONAL SURFACE

[75] Inventors: Kizo Hayakawa, Tokai; Kazunari Teramoto, Toyota; Rokuro Kimura; Isao Ito, both of Nagoya, all of Japan

[73] Assignee: Kabushiki Kaisha Toyota Chuo Kenkyosho, Aichi, Japan

[21] Appl. No.: 7,003

[22] Filed: Jan. 27, 1987

[30] Foreign Application Priority Data

Jan. 28, 1986 [JP] Japan ................................. 61-16321

[51] Int. Cl.$^5$ ................................................ B23C 1/00
[52] U.S. Cl. ........................................ 409/84; 407/54;
409/132; 51/327
[58] Field of Search ...................... 409/131, 132, 84;
408/1 R; 407/54, 57, 63; 51/327

[56] References Cited

U.S. PATENT DOCUMENTS 3,042,994 7/1962 Ruggeberg ...................... 407/54 X
4,176,992 12/1979 Ross et al. ............................ 409/131

FOREIGN PATENT DOCUMENTS 59-102510 6/1984 Japan .

Primary Examiner—Z. R. Bilinsky
Attorney, Agent, or Firm—Oliff & Berridge

[57] ABSTRACT

A three dimensional surface shaping tool comprising a machining portion, wherein a graphical projection of the outermost locus of the motion of the machining portion, onto a plane parallel to the longitudinal axis of the tool, has a shape comprising a curve expressed by at least one equation or a combination of at least one straight line and at least one of the curve, and a three dimensional surface shaping method using the above mentioned tool, which comprises the steps of determining the desired shape of the surface; choosing a shape of the tool based on the desired shape of the surface; and contacting the tool with a workpiece under tool motion control such that the contact with the tool occurs at points along the machining portion of the tool where a curvature thereof is most appropriate for the desired surface shape.

10 Claims, 5 Drawing Sheets

METHOD AND TOOL FOR MACHINING A THREE DIMENSIONAL SURFACE

BACKGROUND OF THE INVENTION

1. Field of the Invention

The present invention relates to a method and a tool for machining a three dimensional surface, and in particular, to a method of three dimensional surface machining such as by cutting or grinding and electrical shaping such as by discharge or electrolysis and to a tool for three dimensional surface work to be used in the method.

2. Description of the Prior Art

Conventionally, when machining a three dimensional surface, a tool like a ball end mill has generally been used because of the ease in selection of the tool and in the calculation for the proper positioning of the tool, where the tool (FIG. 11) constitutes a portion of a circle in projected shape (referred to as a projection of a cutting edge below) obtained by graphically projecting the locus of points comprising the outer-most cutting portion of the tool being used for the machining of a workpiece, onto a plane parallel to the longitudinal axis of the tool, said cutting portion of the tool being a cutting edge directly contributing to the machining, for example, a portion (referred to as a cutting edge below) corresponding to a machining portion of a discharge electrode. In FIG. 11, reference numeral 1 indicates the center axis of the rotation of the tool. In this case, to select a tool, the radius R of the tip of the tool need only be smaller than the minimum radius of curvature of the recessed portion of the three dimensional surface (referred to as a machining surface below) of a workpiece to be machined and the tool position is determined by use of a vector having a magnitude of the radius R of the tool along the direction of the normal at the machining position in the machining surface, regardless of the position of the machining point in the circle of the cutting edge; that is, the tool position is set so that the cutting edge of the tool is brought into contact with the workpiece, which is relatively easy if the necessary information about the machining surface is obtained.

However, the curvature of the work surface of the workpiece generally varies from point to point, and hence, when the projection of the cutting edge is a circle, if the machining surface has a recessed portion with a small radius of curvature, the recessed portion must necessarily be the reference for selecting a tool so as to prevent undercut. This leads to the restriction that a tool with a small radius must be used. As such, other portions having considerably greater radii must be machined with the tool having a smaller radius, thereby causing disadvantages with respect to work efficiency and/or desired surface smoothness. That is, as the radius of the tool is decreased work efficiency is lowered if the predetermined smoothness of the finished surface is to be maintained. The finished surface becomes relatively rough if machining efficiency is not sacrificed, due to portions of the work (machining) surface remaining between incremental machined areas of the surface.

SUMMARY OF THE INVENTION

The present inventors have made efforts to solve the disadvantages of the prior art technique and as a result have devised a machining method which overcomes problems associated with the conventional technique. Namely, according to the method, a tool with cutting edges having different curvatures in a wide range is appropriately used depending on the change of the curvature of the machining surface.

That is, according to the three dimensional surface machining method of the present invention, there is used a tool comprising a machining portion, wherein a graphical projection of the outer-most locus of the motion of the machining portion, onto a plane parallel to the longitudinal axis of the tool, has a shape comprising at least a curve having different curvatures therealong and expressed by at least one equation, or a combination of at least one straight line and at least one said curve. The tool is brought into contact with a workpiece, and the position, the attitude, and the moving state of the tool are controlled according to the shape of the machining surface, so that the tool moves along the shape of the machining surface of the workpiece.

As just described, a tool having cutting edges with different curvatures at points therealong is utilized and comporting with the shape of a machining surface. The shape of the graphical projection of the cutting edge comprises at least one kind of curve representable with $y = f(x)$ or a combination of at least one straight line and at least one said curve as shown in FIGS. 1a–1b. The position and the state of motion of the tool is controlled according to the shape of the machining surface. In addition to the above, the attitude of the tool may be controlled, for example, by multiaxis machining with at least four axes in order to apply a cutting edge portion having a different curvature to the work surface more effectively so as to obtain further enhanced effectiveness, as necessary. This method is characterized in that the shape of a tool having an appropriate change in the curvature is selected by determining the change of the curvature of the machining surface and that at the same time a state in which the difference between the curvatures is advantageously minimized by controlling the attitude of the tool under the condition that the curvature of the tool exceeds that of the machining surface and an undercut does not take place in a recessed portion.

As for the gist of the present invention, namely, the curves of $y = f(x)$ providing for different curvatures therealong, a quadratic curve is appropriate because of the ease of the calculation in practice. Moreover, for a parabola represented by $y = ax^2$, the shape thereof is determined with one element (a), and hence the curve is advantageous for normalization of the tool to the machining surface. In addition, an elliptical curve is practically advantageous because an ellipse has a tangent line parallel to the axis of the tool and the change of curvature is smooth.

Additionally, as means providing a projection of the cutting edge having a shape including at least one kind of curve of $y = f(x)$ or a combination of at least a straight line and at least one said curve, a tool formed in the shape described above may be used in a stationary or rotating state; furthermore, a combination of motion mechanism such as a mechanism with an eccentricity as shown in FIG. 2a and a mechanism for providing a precessional motion as shown in FIG. 2b may also be applicable. In FIGS. 2a–2b, reference numeral 2 indicates the center axis of the tool and reference numeral 3 is the outer-most portion of the locus of points in the motion of the tool.

The term "tool" as used in the present specification includes such tools generally applied in machine work or electric work such as a cutting tool, a cutting grindstone, or a discharge work electrode; moreover, the cutting tool of any type selected from the solid type, the brazing type, and throw away types can naturally be used. In addition, the formation of the shape can be easily achieved by use of a numerical control (NC) function fully developed and known in the art.

In contrast with milling work in which the known ball end milling cutter, a radius end milling cutter having an R section at a corner thereof, or a tool (ball end milling cutter) such as described in the Japanese Patent Laid-Open No. 59-102510 with a new shape for improving the work efficiency and for reducing the remaining portion in the cutting due to the pick feed is used, the essential characteristic of the present invention resides in two primary factors of three dimensional surface machining. Namely, the shape of the workpiece and the shape of the tool are comprehensively examined to determine the tool shape, its position and movement, and the attitude thereof, so that the machining is efficiently implemented by use of the different curvatures at the respective points on the cutting edge of the tool.

BRIEF DESCRIPTION OF THE DRAWING

The present invention will be apparent from the following detailed description taken in conjunction with the accompanying drawings in which.

DETAILED DESCRIPTION OF THE PREFERRED EMBODIMENTS

The present invention will be described in detail with reference to the preferred embodiments of the present invention. The present invention is not, however, restricted to the following embodiments.

Figure 5:
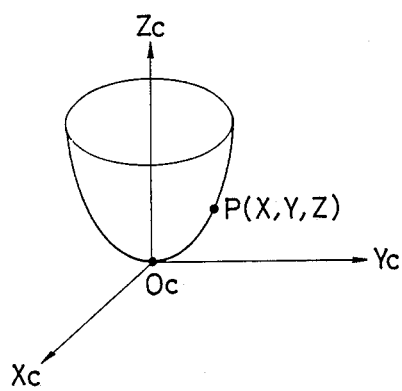
FIG. 5 is a schematic diagram showing an embodiment of a tool for machining a three dimensional surface according to the present invention in which a graphical projection of the outer most locus of the motion of the cutting tool used for the machining, onto a plane parallel to the center axis of the motion of the tool, forms a parabola.

An outline of a method for controlling the tool position to effect the present invention will first be described with reference to an example where the graphical projection of a cutting edge in ordinary 3-axis control machining without the control of the tool attitude is a parabola. In this case, the tool can be regarded as a rotating paraboloid as shown in FIG. 5 which the coordinate (X,Y,Z) of an arbitrary point P on the tool satisfies the standard relationship of mathematics as $$X^2 + Y^2 = 2(1/2a)Z \qquad (1)$$

wherein a is the shape determining parameter. Furthermore, for an arbitrary machining coordinate system of x, y, and z, if the coordinate of the origin of the tool $O_c$ in this system is assumed to be represented with $x_c$, $y_c$, and $z_c$, the following relationship is satisfied.

$$z - z_c = a\{(x-x_c)^2 + (y-y_c)^2\} \qquad (2)$$

Figure 6:
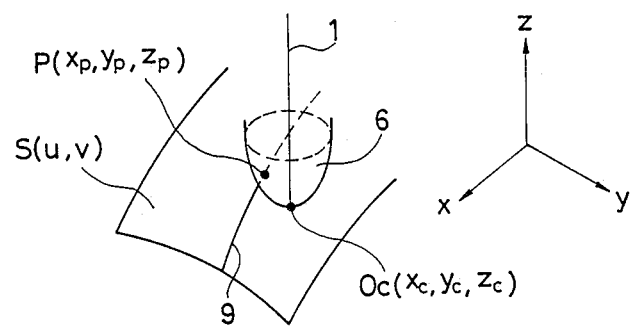
FIG. 6 is a schematic diagram showing a state of the three dimensional surface machining by use of the tool of FIG. 5.

On the other hand, assume that the three dimensional surface of the workpiece to be machined is represented with parameters u and v as follows,

| x = x (u, v) | $u_0 \leq u \leq u_1$ | |
|---|---|---|
| y = y (u, v) | $v_0 \leq v \leq v_1$ | (3) |
| z = z (u, v) | | | and that the tool is brought into contact with the workpiece at a machining point $P(x_p, y_p, z_p)$ in a locus 9 of the machining points on the machining surface S as shown in FIG. 6. For the following vectors:

| $\eta_c = (l_c, m_c, n_c)$ | Unit normal vector at point P on the tool surface |
|---|---|
| $\eta_p = (l_p, m_p, n_p)$ | Unit normal vector at point P on the workpiece surface | the following conditional expressions are obtained.

$$z_p - z_c = a\{(x_p - x_c)^2 + (y_p - y_c)^2\}$$

$$l_p = l_c$$

$$m_p = m_c$$

where,
$x_p = x(u_p, v_p)$
$y_p = y(u_p, v_p)$
$z_p = z(u_p, v_p)$

Differentiating the expressions (2) and (3), the values of $\eta_c$ and $\eta_p$ are represented with expressions including $u_p$, $v_p$, $x_c$, $y_c$ and $z_c$ as parameters, that is, for the three conditional equations, there exist five unknown values of $u_p$, $v_p$, $x_c$, $y_c$, and $z_c$; however, if the function governing the tool motion is given (relating $x_c$ and $y_c$), the number of unknown values can be reduced to three, which enables the equations to be solved, thereby obtaining the necessary control information. An example thereof will be described with reference to FIG. 7. If a function where the tool moves with an axis 1 of the tool being fixed on a plane 10 parallel to the Z axis is given, the value of $x_c$ or $y_c$ can be calculated from a straight line 11 (referred to as a machining line below) obtained by projecting the plane onto the x—y plane, wherein:

$$x_c \cos\alpha + y_c \sin\alpha = g$$

(g, $\alpha$: Parameters determining the straight line) solving for the dependent variable, $u_p$, $v_p$, and $z_c$ may subsequently be obtained. In addition, similar calculation can be conducted where the tool is moved with the machining point fixed on a plane parallel to the Z axis. Alternatively, in a case where zigzag machining is effected in the three dimensional surface according to the parameters $u_p$ and $v_p$ of the three dimensional surface expression, the values of $x_c$, $y_c$, and $z_c$ are attainable from $u_p$ and $v_p$.

Figure 7:
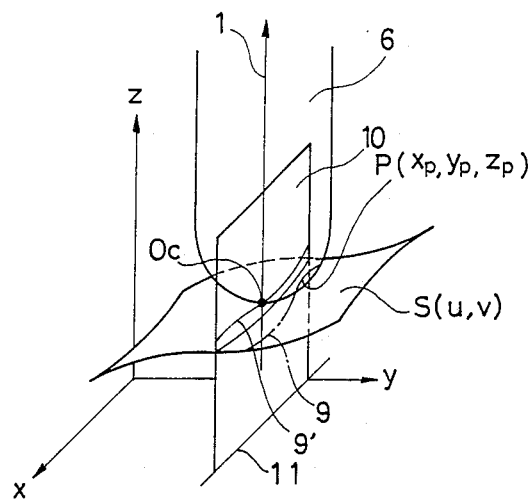
FIG. 7 is a schematic diagram illustrating the three dimensional surface machining of an embodiment of the present invention in which the attitude of the tool is not controlled.
Figure 9:
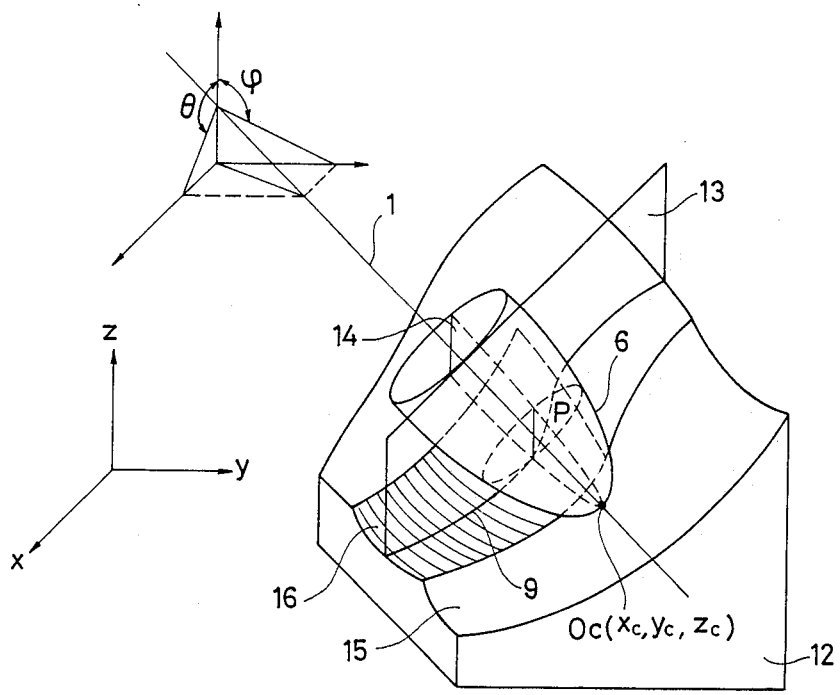
FIG. 9 is a schematic diagram of the three dimensional surface machining with control of the tool attitude according to the present invention in which the tool control is achieved by specifying a function for translational tool motion and a function for the tool attitude.
Figure 8:
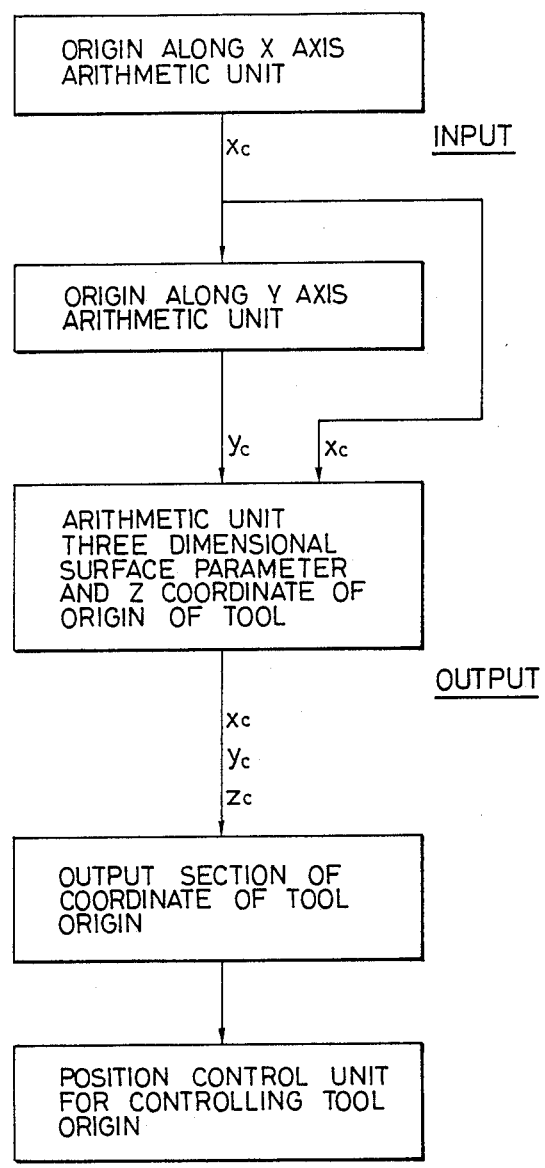
FIG. 8 is an example of a block diagram for effecting the tool control according to the method of FIG. 7.

In FIG. 7, reference numeral 9' indicates the locus of the origin of the tool. FIG. 8 shows an example of a block diagram to be used to implement the method described above in which machining is accomplished with the tool axis being fixed. From the information thus collected, the position of the tool is controlled so that the origin of the tool is $O_c$ ($x_c$, $y_c$, $z_c$) when an arbitrary machining point $P(x_p, y_p, z_p)$ is subjected to machining, thereby enabling an appropriate machining on a three dimensional surface.

Where the projection of the cutting edge forms a parabola as described above, the shape of the tool can be represented with a parameter (a) in the expression (1) and it can be found that the position control is relatively easily facilitated as already noted: moreover, even if the projection is not a parabola but an ellipse, a quadratic curve, or other curves representable by $y = f(x)$, it is readily apparent that the position of the tool can be controlled in a similar fashion.

Where the attitude of the tool is controlled in addition to the position of the tool in multiaxis machining with at least four axes, for example, by use of a fourth axis and a fifth axis, it need only be added a control function of the tool attitude to the function of the translational tool motion, thereby obtaining the coordinate values x, y, and z of the tool origin with respect to the machining coordiate system and the fourth and fifth rotary angles of the tool axis. An example thereof will be described with reference to FIG. 9. There are provided two functions governing movement of the tool: (1) a function controlling translational movement of the tool in which the tool is moved with the machining point P on a workpiece 12 being fixed on a plane 13 parallel to the Z axis (namely, a condition that the line of intersection between the plane 13 and the x-y plane is set as the machining line and that the projection of the machining point onto the x-y plane is fixed on the machining line) and (2) a function controlling the attitude of the axis of the tool such that the axis is fixed on a plane 14 perpendicular to the plane 13 and that at a machining point, a cutting edge of the tool having a curvature most suitable for the curvature of the machining surface is selected, which allows for obtaining the necessary information of $x_c$, $y_c$, $z_c$, $\theta$ and $\phi$ and hence enables to control the tool including the attitude control. In this diagram, reference numeral 15 indicates a plane formed by the milling in the previous cutter pass, whereas reference numeral 16 is a plane formed by the milling in the current cutter pass.

Figure 10:
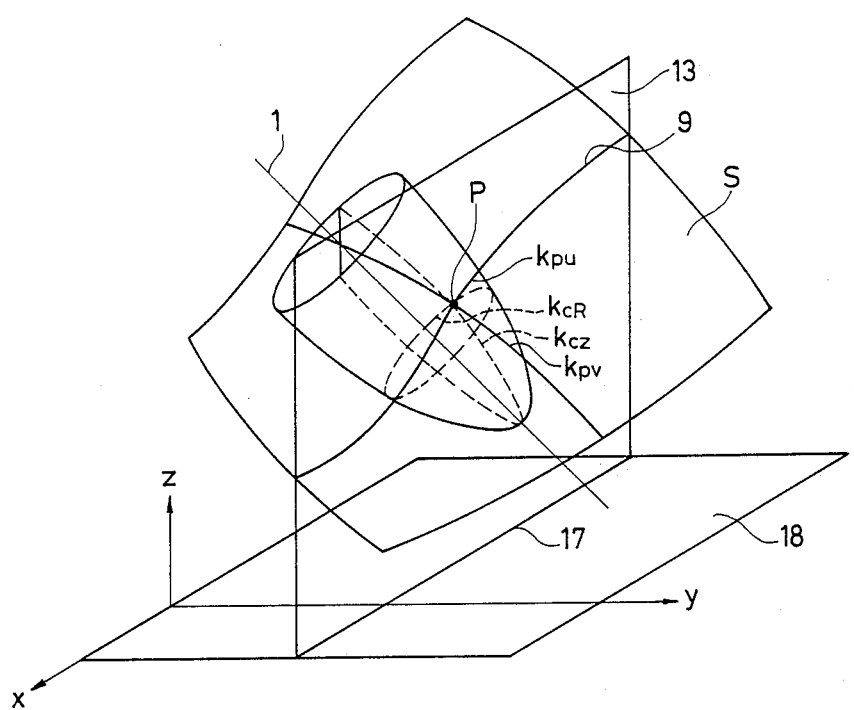
FIG. 10 is an explanatory diagram illustrating the curvatures at the machining points of the tool and the workpiece to be determined in practice when applying the present invention.
Figure 11:
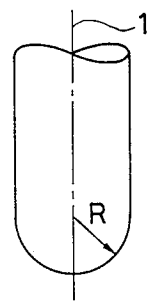
FIG. 11 is a schematic diagram showing an example of the prior art tool for machining a three dimensional surface.

In order to select an appropriate tool which does not cause an undercut in a recessed portion in an ordinary 3-axis machining method without the control of the tool attitude, and to determine an appropriate function governing the tool attitude in a machining process with the control of tool attitude, the curvature of a tool and the curvatures of the surface of a workpiece are required to be precisely determined. For an accurate determination thereof, the maximum and minimum curvatures on the tool must be compared with the maximum and minimum curvatures on the machining surface. The maximum and minimum curvatures on the tool can be easily calculated; however, the maximum and minimum curvatures on the machining surface often cannot be obtained without a great number of steps in the calculation. To overcome this difficulty, the curvatures as shown in FIG. 10 are practically used, where it is sufficient to include some safety coefficients as necessary. In this diagram, reference numeral 17 is a machining line, whereas reference numeral 18 indicates the x-y plane.

(Tool curvatures)
  Kcz: Curvature in the direction of the tool axis
  $Kc_R$: Curvature in a direction perpendicular to the tool axis (Machining surface curvatures)
  Kpu: Curvature in the direction of the machining line
  Kpv: Curvature in a direction perpendicular to the Machining line In ordinary 3-axis machining without the control of the tool attitude, a condition where Kcz or $Kc_R$ is greater than Kpu or Kpv must be avoided to prevent undercut in a recessed portion, and it is only necessary to select a shape of the cutting edge for which this condition is satisfied for all machining positions on the three dimensional surface. When the machining includes the control of the tool attitude, a function governing application of the tool curvatures most suitable for the machining need only be set in advance, thereby determining the attitude of the tool based on the function.

Figure 1A:
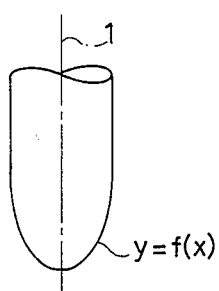
FIGS. 1a-1b are schematic diagrams each illustrating embodiments of tools for machining a three dimensional surface according to the present invention.
Figure 1B:
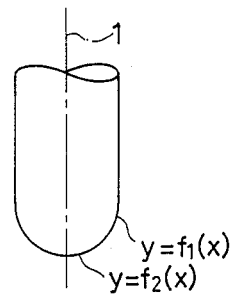
Figure 2A:
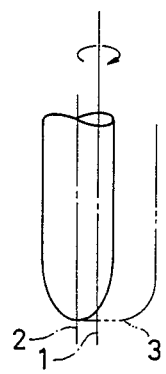
FIG. 2a is a schematic diagram illustrating the state of motion with the center axis of the tool being eccentric with respect to the center axis of the motion of the tool.
Figure 2B:
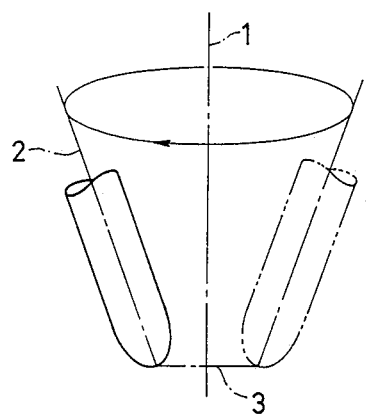
FIG. 2b is an explanatory diagram depicting a state in which the longitudinal axis of the tool is in a precessional motion about the center axis of tool rotation.
Figure 3A:
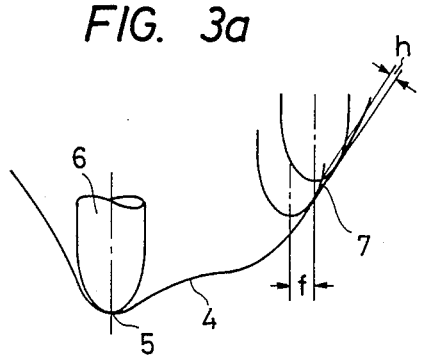
FIG. 3a is a schematic diagram showing the three dimensional surface machining according to the present invention.
Figure 3B:
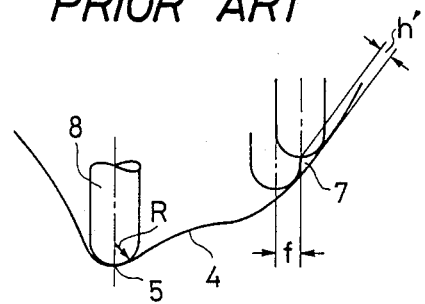
FIG. 3b is a schematic diagram illustrating the three dimensional surface machining according to the conventional method.

FIG. 3 is a diagram showing a comparison of three dimensional surface machining with the conventional method and the method of the present invention. Diagram (a) shows a machining surface 4, a portion of the machining surface having a maximum curvature 5, a three dimensional surface machining tool of the present invention 6, a surface portions remaining after machining 7, a surface roughness after machining using the present invention h, and an pick feed distance f. Diagram (b) shows three dimensional surface machining tool of the prior art 8, a surface roughness after machining using the prior art technique h', and a pick feed f. With the pick feed distance f kept constant in the machining, the surface roughness (the height of the portion remaining in the machining surface) h according to the machining method (FIG. 3a) of the present invention becomes much smaller than the surface roughness h' according to the conventional machining method (FIG. 3b). At the same time, the curvature of the surface of the remaining portion in the shape of a waveform can also be minimized, and hence there is obtained a finished surface which facilitates the post-finishing step of grinding, which enables a considerable increase in overall productivity.

Figure 4:
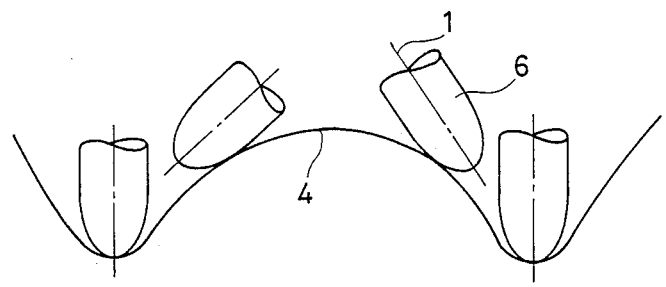
FIG. 4 is an explanatory diagram depicting the three dimensional surface machining of another embodiment of the present invention in which the attitude of the tool is controlled.

Moreover, with multiple axis control (as in a NC machine tool) for controlling at least four axes, if the machining surface and the relative attitude of the tool are also controlled as shown in FIG. 4, the position of the cutting edge of the tool having a curvature most suitable for the curvature at the machining position of the machining surface can be selectively chosen to correspond to the machining surface; consequently, even for a tool of which the shape is not represented with a complex function, a relationship fitting with the shape of the machining surface in a wider range can be obtained between the curvature of the machining surface and the curvature of the tool, which increases the degree of freedom in the machining.

According to the three dimensional surface machining method of the present invention as described above, a workpiece to be machined is brought into contact with a tool wherein the locus of points comprising the outer-most portion of the machining tool used for the machining when projected onto a plane parallel to the longitudinal axis of the tool, has a shape formed with at least a kind of curve or a combination of a straight line and curve wherein the curve has differing curvatures at points therealong. Furthermore, the characteristic resides in that the position, the attitude, and the state of motion of the tool are controlled according to the shape of the surface to be machined, thereby, the tool may be moved along the shape of the surface of the workpiece to be machined. Consequently, if the change in the curvature of the machining surface is determined to select a combination of a function having the change of the curvature most suitable for the machining of the surface, and a tool formed so that the projection of a portion for the machining (a cutting edge) of the shape identical to the shape of the surface is used, the relationships with respect to the curvature between the tool and the portion of the machining surface on which the machining is effected are greatly improved as compared with the prior art technique. Hence the precision of the surface machining and the machining efficiency are greatly improved as compared with the conventional technique. More specifically, the machining efficiency is greatly increased for a given surface smoothness to be finished, or the surface smoothness may be greatly improved for the same machining efficiency.

In addition to these advantages, in the case where the attitude of the tool is controlled, and machining precision is given precedence to efficiency and tool life, machining can be effected in such an almost ideal manner. By controlling the tool axis such that it is to be located in the ideal position in the possible neighborhood along the direction of the normal to the machining surface, the variation in the machining load during machining may be advantageously suppressed.

Furthermore, since the portion of the three dimensional surface machining tool to be used for the machining (the cutting edge) is of the shape described above, the tool can be used for machining a workpiece having a more complicated three dimensional surface as compared with the three dimensional surface machining tool of the prior art, and this tool can be applied to various machining surfaces when combined with the control of the tool attitude.

What is claimed is:

1. A method for shaping a three dimensional surface on a workpiece using a tool comprising a machining portion, wherein a graphical projection of the outer-most locus of the motion of the machining portion onto a plane parallel to the longitudinal axis of the tool has a shape comprising at least one curve whose curvature is changed continuously, said at least one curve comprising an elliptical curve at a tip portion of said tool, said method comprising the steps of:
   (a) determining the desired shape of said surface;
   (b) choosing a shape of said tool based on the desired shape of said surface;
   (c) calculating information of tool position and tool attitude on a machining line such that the curvature of said tool at machining points along said machining portion is substantially equal to the curvature of said surface to be machined and said tool substantially tangentially contacts the surface to be machined at said machining points; and
   (d) controlling tool position and tool attitude on the machining line by controlling tool position control means and tool attitude control means based on the calculated information such that tool contact with said workpiece occurs at points along the machining portion of said tool where a curvature thereof is most appropriate for the desired surface shape.

2. The method of claim 1, wherein said curve further comprises a quadratic curve.

3. The method of claim 1, wherein said curve further comprises a parabolic curve.

4. The method of claim 1, wherein said curve entirely comprises an elliptical curve.

5. The method of claim 1, wherein said curve further comprises a portion of a parabolic curve and a portion of an elliptical curve.

6. The method of claim 1, wherein the shape of said graphical projection further comprises at least one straight line.

7. A tool for shaping a three dimensional surface, said tool comprising a machining portion, wherein a graphical projection of the outer-most locus of the motion of the machining portion, onto a plane parallel to the longitudinal axis of the tool, has a shape comprising at least one curve whose curvature is changed continuously, said at least one curve comprising an elliptical curve at a tip portion of said tool, a tangent of said curve being parallel to the longitudinal axis of the tool at a connecting portion between the curve and a straight line portion of the tool parallel to said tool axis.

8. The tool of claim 7, wherein said graphical projection has a shape of an elliptical curve.

9. The tool of claim 7, wherein the shape of said graphical projection further comprises at least one straight line.

10. A method for shaping a three dimensional surface on a workpiece using a tool comprising a machining portion, wherein a graphical projection of the outer-most locus of the motion of the machining portion onto a place parallel to the longitudinal axis of the tool has a shape comprising at least one curve whose curvature is changed continuously, said at least one curve comprising an elliptical curve at a tip portion of said tool, said method comprising the steps of:
   (a) determining the desired shape of said surface;
   (b) choosing a shape of said tool based on the desired shape of said surface;
   (c) calculating information of tool position and tool attitude on a machining line such that the curvature of said tool at machining points along said machining portion is substantially equal to the curvature of said surface to be machined and said tool substantially tangentially contacts the surface to be machined at said machining points; and (d) controlling tool position and tool attitude on the machining line by controlling tool position control means and tool attitude control means based on the calculated information such that tool contact with said workpiece occurs at points along the machining portion of said tool where a curvature thereof is most appropriate for the desired surface shape, said tool attitude being controlled at the machining point within a plane with a given angle to the machining line.

* * * * *